No. 376,038. PATENTED JAN. 7, 1908.
E. E. BRYAN & W. E. TAYLOR.
FRUIT PICKER'S BUCKET.
APPLICATION FILED MAR. 13, 1907.
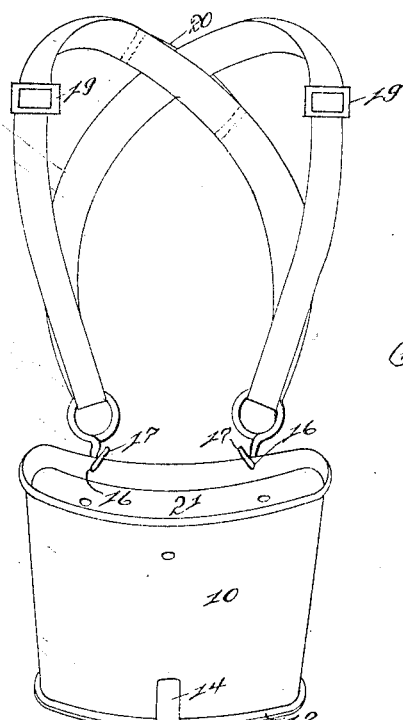
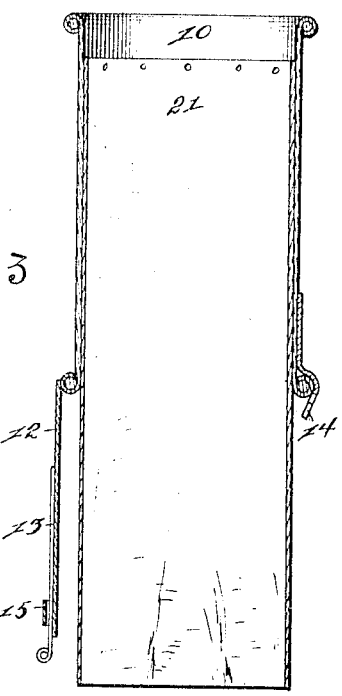

UNITED STATES PATENT OFFICE.

ERNEST E. BRYAN AND WARREN E. TAYLOR, OF PAONIA, COLORADO.

FRUIT-PICKER'S BUCKET.

No. 876,038.  Specification of Letters Patent.  Patented Jan. 7, 1908.

Application filed March 13, 1907. Serial No. 362,729.

*To all whom it may concern:*

Be it known that we, ERNEST E. BRYAN and WARREN E. TAYLOR, citizens of the United States, residing at Paonia, in the county of Delta and State of Colorado, have invented a new and useful Fruit-Picker's Bucket, of which the following is a specification.

Our object is, first, to provide a bucket for apples, cherries, berries, and all kinds of fruit that can be carefully picked and placed in the bucket while it is suspended in front of a person and the hands of the person are free to gather the fruit from trees and bushes: second to provide means for adjustably and detachably connecting the bucket with a person as required to be suspended and carried in front of the person; third, to provide means to prevent the fruit from being touched by a person and handled and bruised in removing the fruit from the basket into which it has been placed by the picker.

Our invention consists in the construction, arrangement and combination of parts as hereinafter set forth, pointed out in our claims and illustrated in the accompanying drawings, in which:—

Figure 1 is a perspective view that shows the complete device ready to be suspended on a person as required for practical use. Fig. 2 is an enlarged bottom view of the bucket and shows a spring latch for fastening the bottom of the bucket when it is hinged to the bucket at its rear edge. Fig. 3 is a vertical central sectional view that shows the hinged bottom in an open position and a flexible lining fixed in the top portion of the bucket and extended down and below the bucket some distance to serve as a means for emptying fruit from the bucket into another receptacle without touching and bruising the fruit. Fig. 4 is a vertical central sectional view that shows a modified form of bucket provided with a fixed bottom and a hinged bail at its top and apertures to admit the hooks of the adjustable suspending shoulder straps shown in Fig. 1.

The numeral 10 designates the bucket made of suitable sheet metal. It is transversely oblong in shape and its inner side curves inwards to contact with the person who carries it and its outside is curved outward as shown in Fig. 1. At its widest portion it is about sixteen inches from end to end and at its transverse center about ten inches wide and its length from top to bottom is about twelve inches. It is obvious however its dimensions may vary as desired to be adapted for large and small fruits to be carried therein without being pressed and bruised by their weight upon each other.

A bottom 12, conforming in shape with the lower end of the bucket is hinged to the inwardly curved edge and has a spring clasp 13 fixed to its under side to engage a catch device 14, fixed to the outside of the basket, as shown in Figs. 1, 2 and 3, as required for retaining the hinged bottom closed.

A loop 15 is fixed to the bottom over the parallel ends of the spring clasp 13 as shown in Fig. 2.

Apertures 16 are provided in the top of the rear and inwardly curved part of the basket 10 to admit hooks 17 on the ends of adjustable suspender straps to be inserted as required to connect the suspenders with the bucket. The ends of the suspender straps have fixed loops or buckles 19, by which they can be lengthened and shortened in a common way to adjust them to persons of different size. The straps cross each other at their tops and are kept together by a loop 20 fixed to one of them and under which the other strap can slide as required to allow the overlying portions of the straps to adjust themselves relative to each other and the neck and shoulders of the person upon which they are placed and worn.

A flexible lining 21, of woven fabric or light leather is fixed in the top of the portion of the basket to depend through the lower end of the bucket as shown in Fig. 3 in such a manner that it will serve as an adjustable or yielding funnel adapted to convey fruit from the bucket when its bottom is open, into another receptacle without touching, handling and bruising the fruit. And when the soft flexible lining is doubled up into the bucket and the hinged bottom closed the lining will serve as a cushion for the fruit that is picked and dropped into the bucket.

In the practical use the shoulder straps are placed over a person's neck and shoulders and the wearer's arms extended through the openings between the straps and the hooks 17 at their lower ends inserted in the apertures 16 in the bucket so that the bucket can be advantageously carried while the person's hands and arms are free to pick fruit and place it in the bucket.

Having thus set forth the purpose of our invention and its construction and manner of use, what we claim as new and desire to secure by Letters-Patent, is:—

1. A fruit picker's bucket, having an open top, a bottom hinged to its lower edge, a spring clasp on the under side of the bottom and a catch device on the outside of the lower end of the bucket to engage the spring clasp, a flexible lining fixed in its top to extend down through the bottom and means to suspend the bucket from a person's neck and shoulders in the manner shown and described.

2. A fruit picker's bucket comprising an open-topped receptacle having a hinged bottom, means to retain the hinged bottom closed, a flexible lining fixed on the inside of the upper end of the receptacle and longer than the receptacle and adjustable suspenders detachably connected with the top edge of the receptacle, to operate in the manner stated.

ERNEST E. BRYAN.
WARREN E. TAYLOR.

Witnesses:
C. C. HAWKINS,
L. B. HAWKINS.